(12) United States Patent
Li

(10) Patent No.: US 12,510,213 B1
(45) Date of Patent: Dec. 30, 2025

(54) LED LIGHT

(71) Applicant: Zhenhong Li, Liuyang (CN)

(72) Inventor: Zhenhong Li, Liuyang (CN)

( * ) Notice: Subject to any disclaimer, the term of this patent is extended or adjusted under 35 U.S.C. 154(b) by 0 days.

(21) Appl. No.: 19/301,069

(22) Filed: Aug. 15, 2025

(51) Int. Cl.
| | |
|---|---|
| *F21K 9/237* | (2016.01) |
| *F21K 9/232* | (2016.01) |
| *F21K 9/235* | (2016.01) |
| *F21Y 115/10* | (2016.01) |

(52) U.S. Cl.
CPC .............. *F21K 9/237* (2016.08); *F21K 9/235* (2016.08); *F21K 9/232* (2016.08); *F21Y 2115/10* (2016.08)

(58) Field of Classification Search
CPC .................................. F21K 9/237; F21K 9/232
See application file for complete search history.

(56) References Cited

U.S. PATENT DOCUMENTS

| | | | | |
|---|---|---|---|---|
| 9,811,985 | B2* | 11/2017 | Lutz | H02J 7/00309 |
| 10,030,863 | B2* | 7/2018 | Pickard | F21V 29/74 |
| 10,091,861 | B2* | 10/2018 | Usui | H05B 47/105 |
| 10,178,745 | B2* | 1/2019 | Hall | H05B 47/105 |
| 2007/0247840 | A1* | 10/2007 | Ham | F21K 9/23 362/227 |
| 2014/0265845 | A1* | 9/2014 | Williams | H02J 9/065 315/86 |
| 2021/0270454 | A1* | 9/2021 | Conrad | F21V 23/06 |

\* cited by examiner

*Primary Examiner* — Eric T Eide
(74) *Attorney, Agent, or Firm* — JEEN IP LAW, LLC

(57) ABSTRACT

An LED lamp is provided, which includes a connector, a lamp holder, a battery, a support member, a light source, and a lampshade; the light source is sleeved on the support member; the battery is located within the support member; the support member is connected to the lamp holder; the lampshade is connected to the lamp holder; the connector is magnetically connected to the lamp holder. A detachable design of the connector and the lamp holder facilitates the use of the LED light and enables the LED light to be flexibly selected and used according to usage needs.

7 Claims, 30 Drawing Sheets

LED LIGHT

TECHNICAL FIELD

The present disclosure relates to the field of LED light technologies, and in particular, to an LED light.

BACKGROUND

LED lights have a wide range of applications in the field of lighting, such as LED reading lights, LED pendant lights, LED floor lamps, LED spotlights, and other scenarios. Besides that, it is widely used in entertainment venues, commercial places, and home lighting.

However, in existing LED lights, they are often fixed to sockets, which is not convenient and flexible to use.

SUMMARY

The embodiment provides an LED lamp that is convenient and flexible to use and can expand the ways of use.

In order to achieve the above objectives, the present application provides an LED lamp.

An LED lamp, including a connector, a lamp holder, a battery, a support member, a light source, and a lampshade; the light source is sleeved on the support member; the battery is located inside the support member; the support member is connected to the lamp holder; the lampshade is connected to the lamp holder; the connector is detachably connected to the lamp holder; the connector includes a connection bottom shell.

In some embodiments of the present disclosure, the support member includes a support control part and a support part; the support control part is connected to the support part; the support control part includes a support circuit board and a first connection terminal; the first connection terminal is connected to the support circuit board; the light source is connected to the support circuit board, and the battery is connected to the support circuit board.

In some embodiments of the present disclosure, the connector is magnetically connected to the lamp holder, and the lamp holder includes a lamp holder housing and a first magnetic attraction member; the first magnetic attraction member is connected to the lamp holder housing.

In some embodiments of the present disclosure, the connector further includes a connection part and a second magnetic attraction member; the connection bottom shell is connected to the connection part; the second magnetic attraction member is connected to the connection bottom shell.

In some embodiments of the present disclosure, the connection part includes a connection housing and a plug, where the plug is connected to the connection housing.

In some embodiments of the present disclosure, the connector is fastened to the lamp holder, and the connection bottom shell includes a bottom shell body and a connection clamp block, where the connection clamp block is connected to the bottom shell body; the lamp holder housing is provided with a connection clamp slot; the connection clamp block is inserted into the connection clamp slot.

In some embodiments of the present disclosure, the connector includes a connection control part; the connection control part includes a connection circuit board and a second connection terminal; the connection circuit board is connected to the second connection terminal.

In some embodiments of the present disclosure, the second connection terminal is one or more of an electrode pin, a DC interface, and a USB interface.

Beneficial effect: a detachable design of the connector and the lamp holder facilitates the use of the LED light and enables the LED light to be flexibly selected and used according to usage needs.

BRIEF DESCRIPTION OF DRAWINGS

Combining with the accompanying drawings, a detailed description of specific implementation of the present application will render the technical solution and its beneficial effects obvious.

Figure 1:
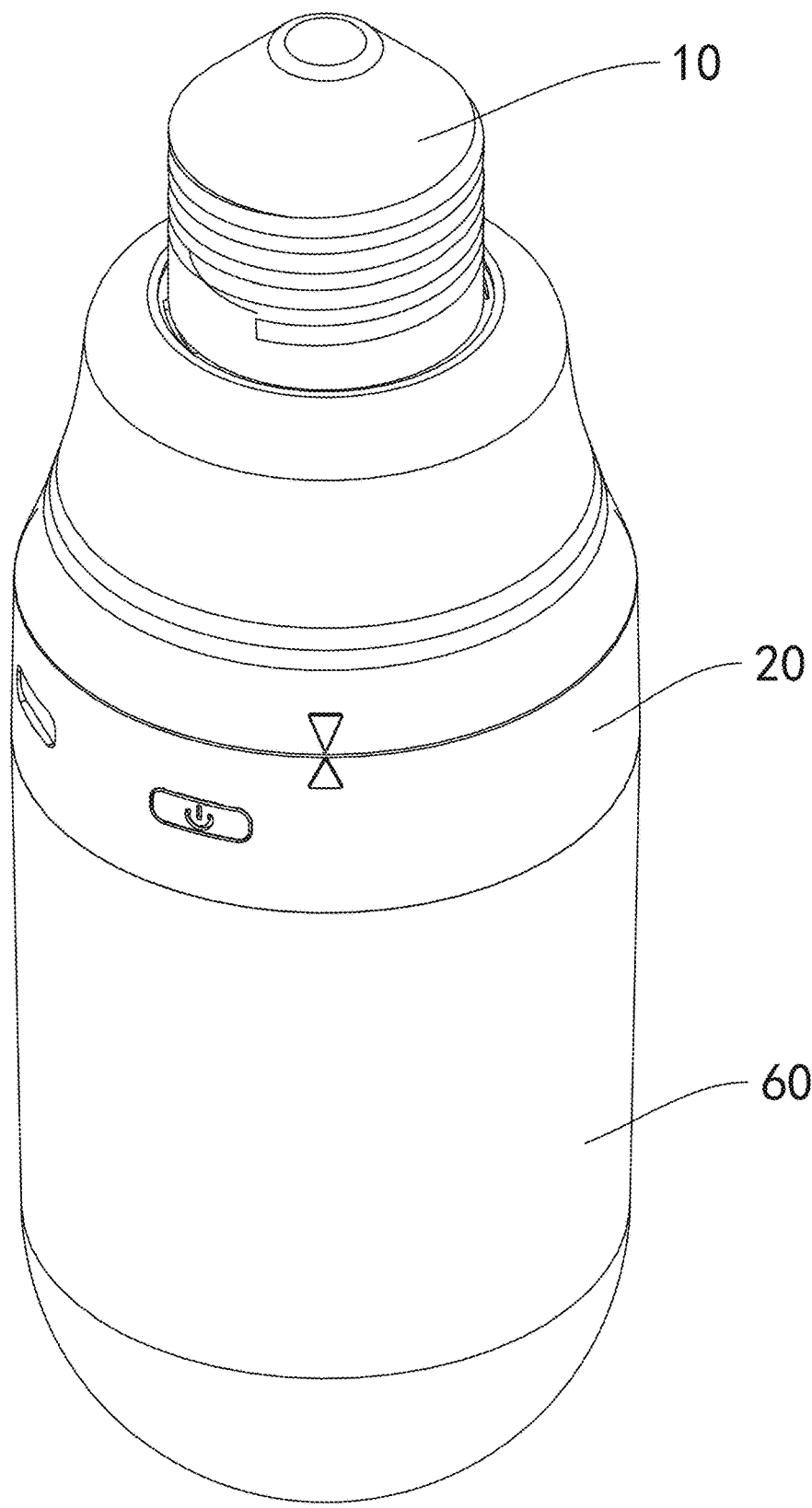
FIG. 1 is a schematic structural diagram of an LED lamp according to an embodiment of the present application.
Figure 2:
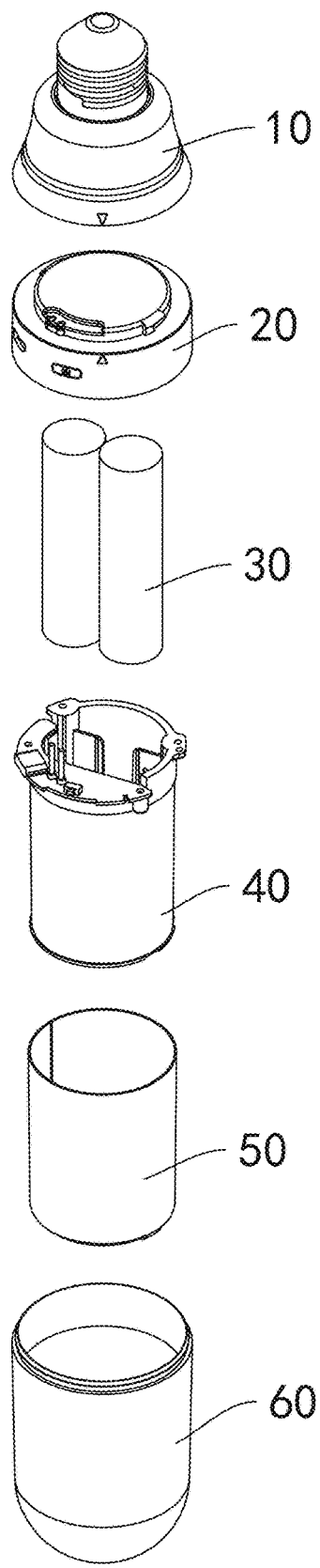
FIG. 2 is an exploded schematic diagram of the LED lamp shown in FIG. 1.
Figure 3:
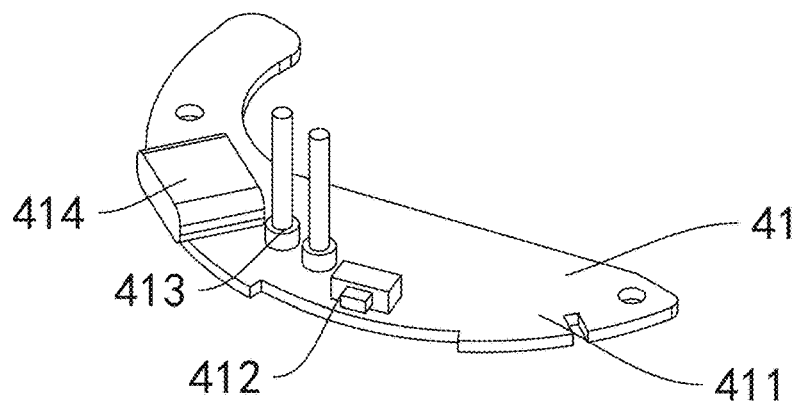
FIG. 3 is an exploded schematic diagram of a support member shown in FIG. 1.
Figure 3:
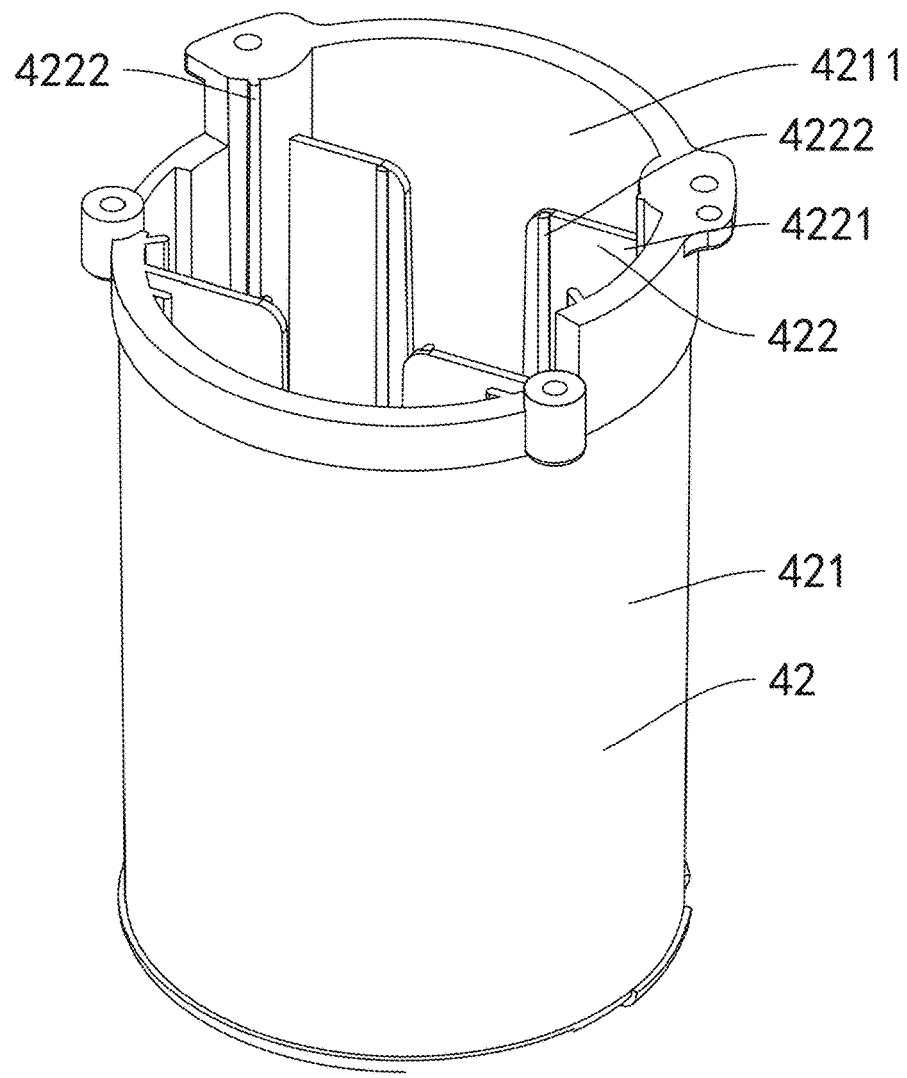
Figure 4:
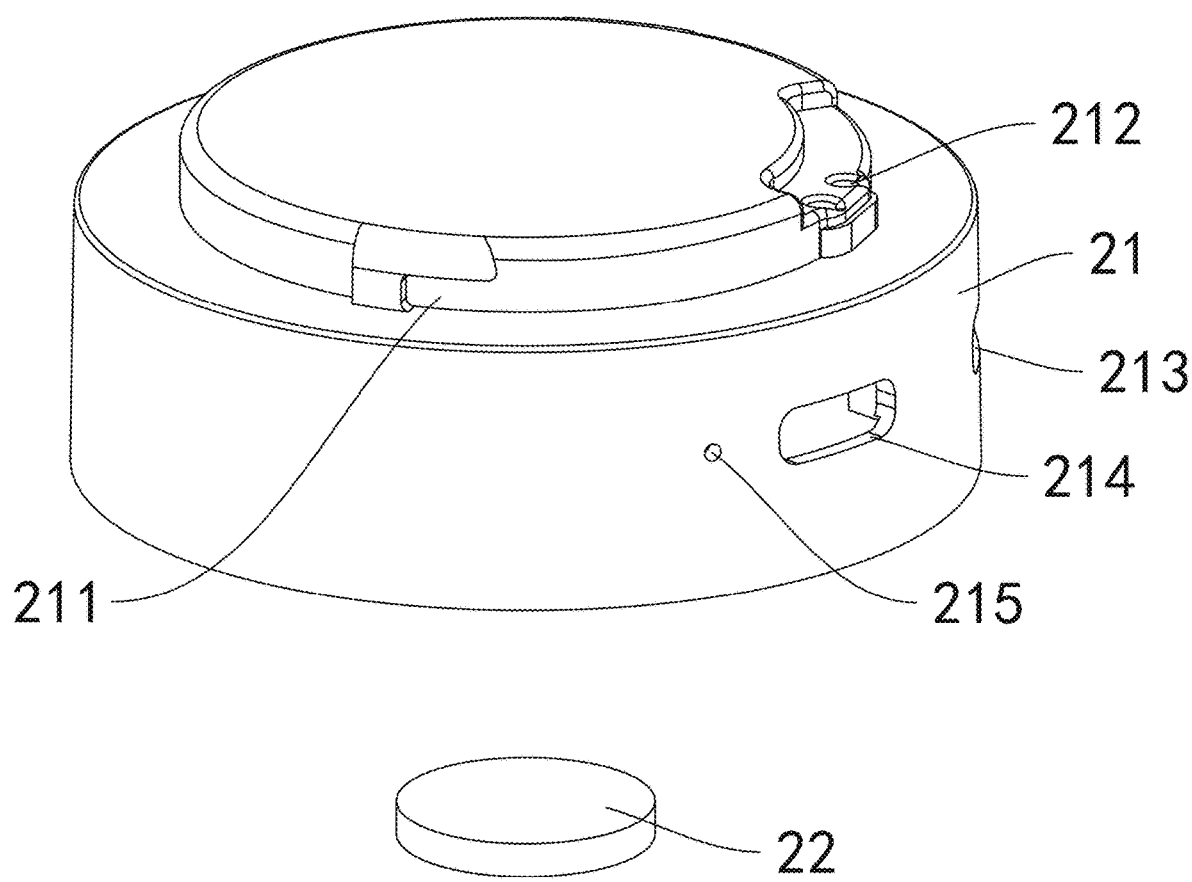
FIG. 4 is an exploded schematic diagram of a lamp holder shown in FIG. 1.
Figure 5:
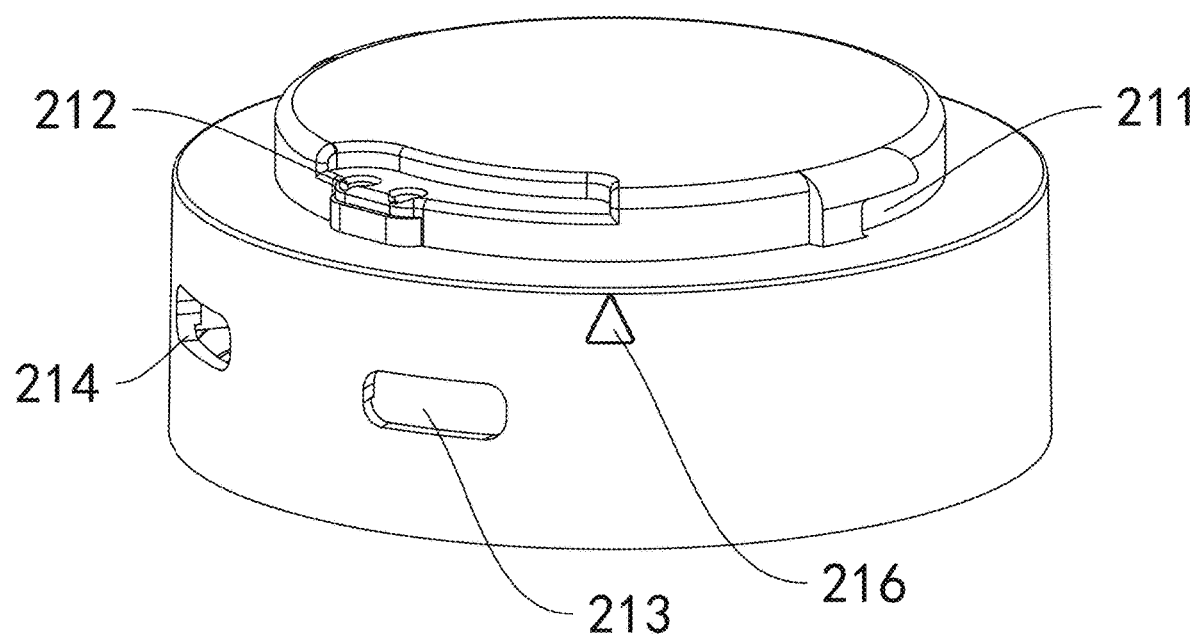
FIG. 5 is a first axial schematic diagram of a lamp holder housing shown in FIG. 1.
Figure 6:
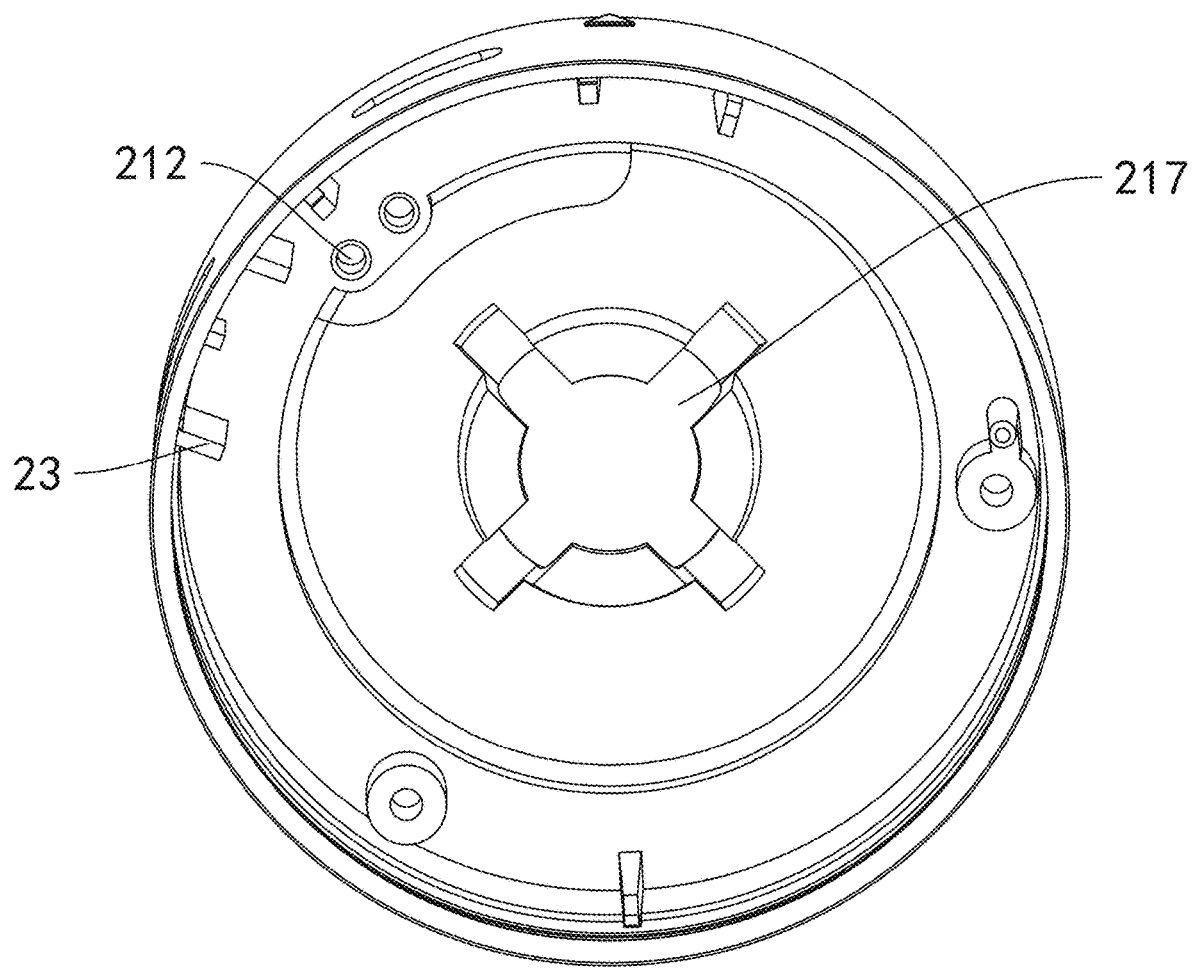
FIG. 6 is a second axial schematic diagram of the lamp holder housing shown in FIG. 1.
Figure 7:
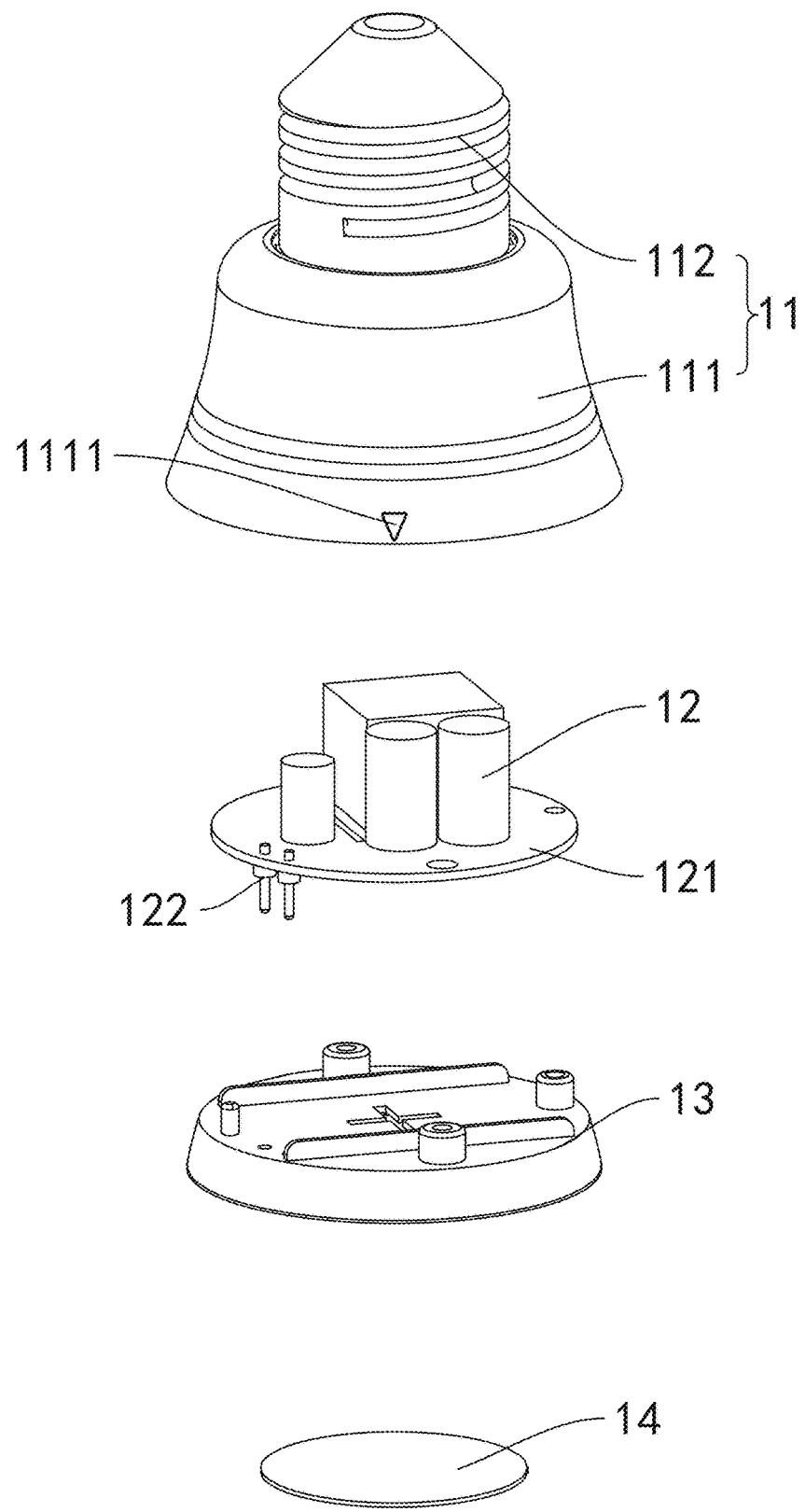
FIG. 7 is an exploded schematic diagram of a connector shown in FIG. 1.
Figure 8:
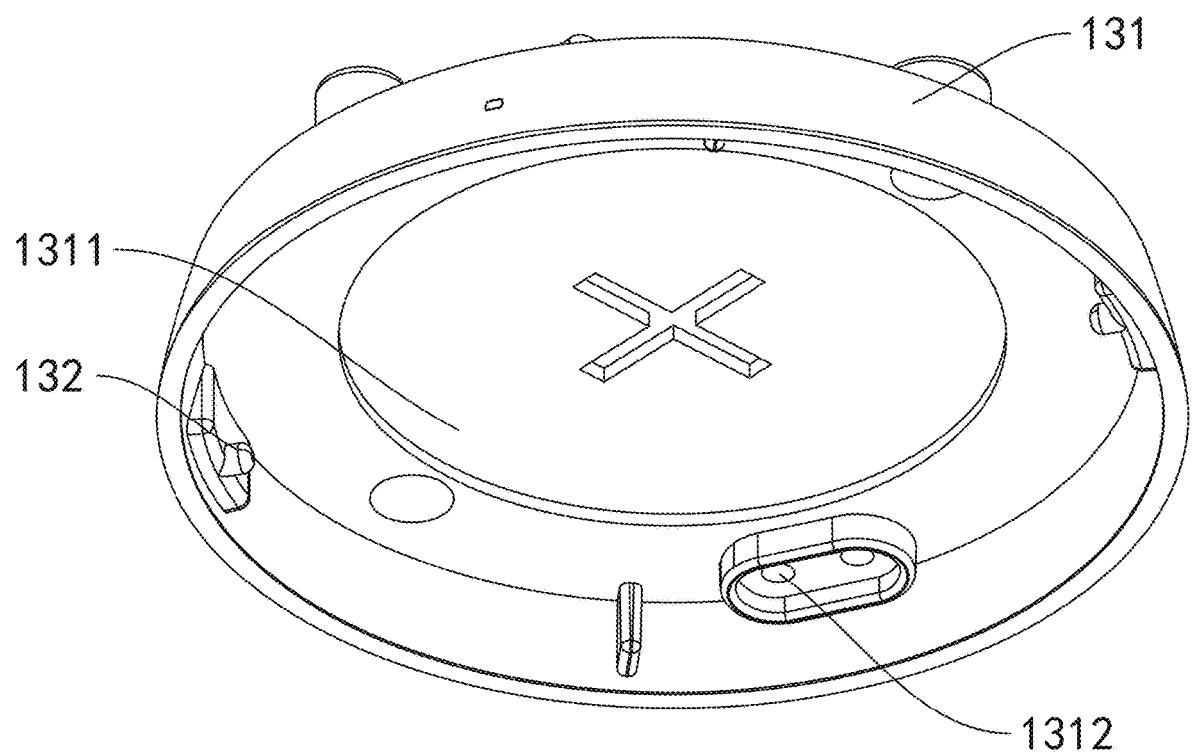
FIG. 8 is a schematic axial view of a connection bottom shell shown in FIG. 1.
Figure 9:
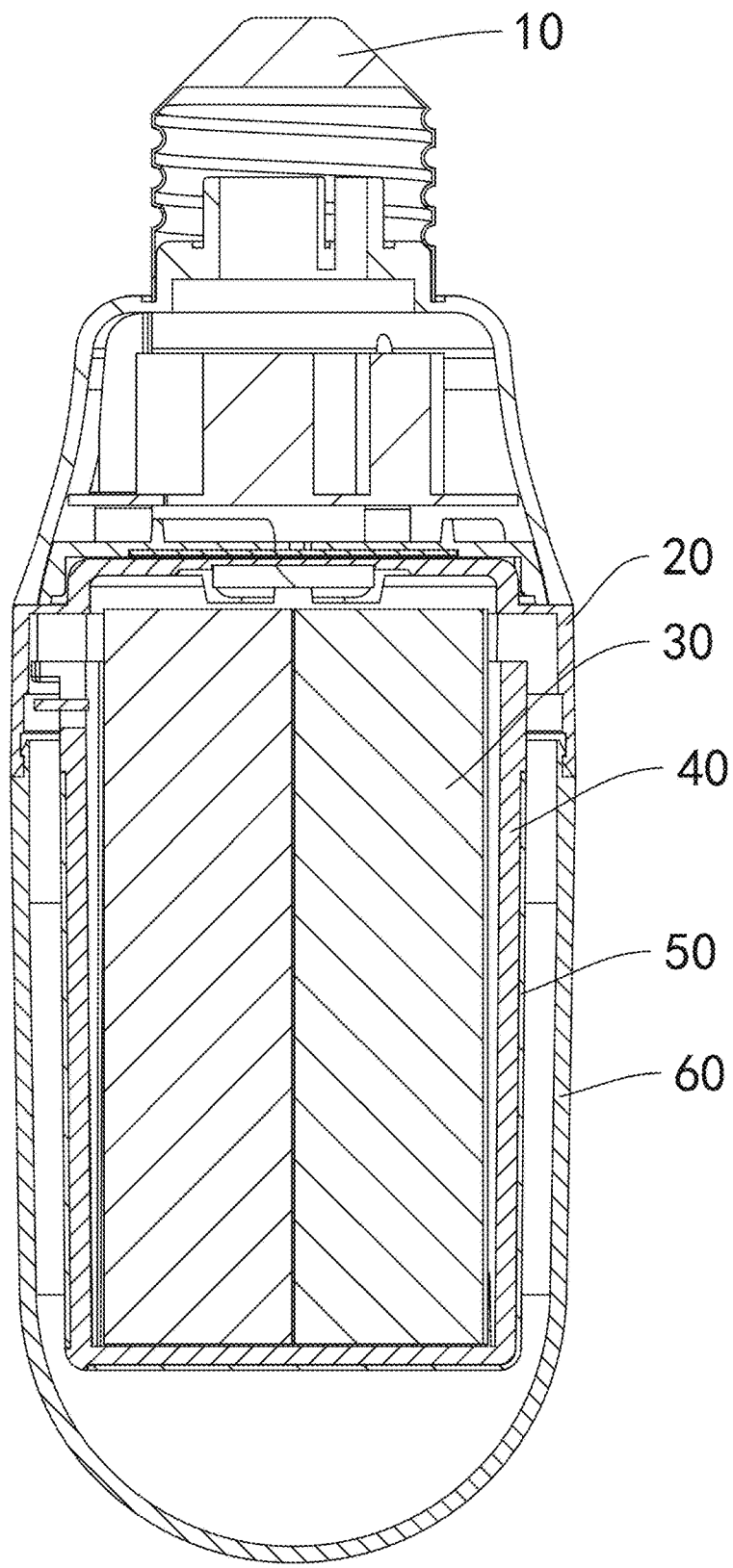
FIG. 9 is a schematic sectional view of an LED lamp shown in FIG. 1.
Figure 10:
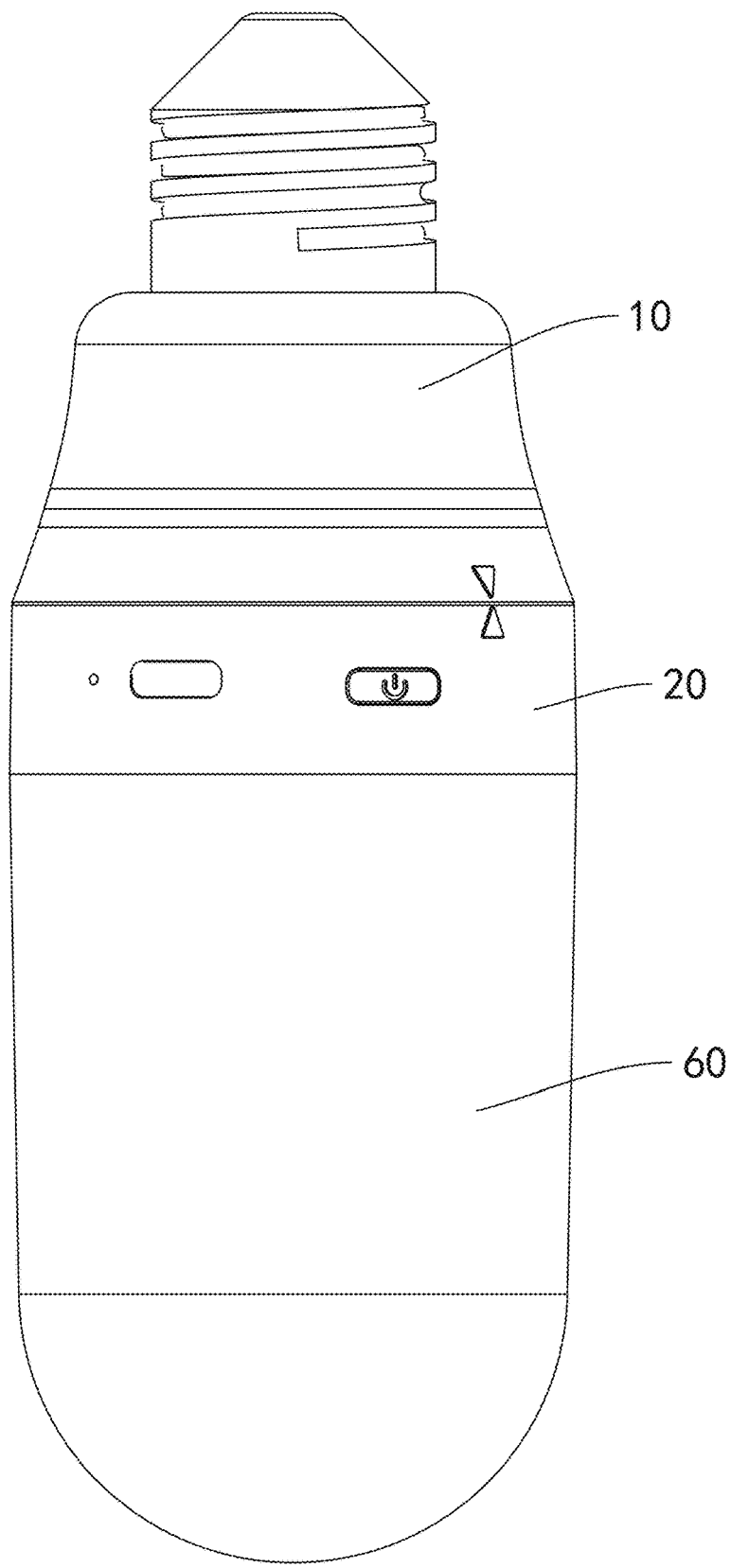
FIG. 10 is another schematic structural diagram of the LED lamp in an embodiment of the present application.
Figure 11:
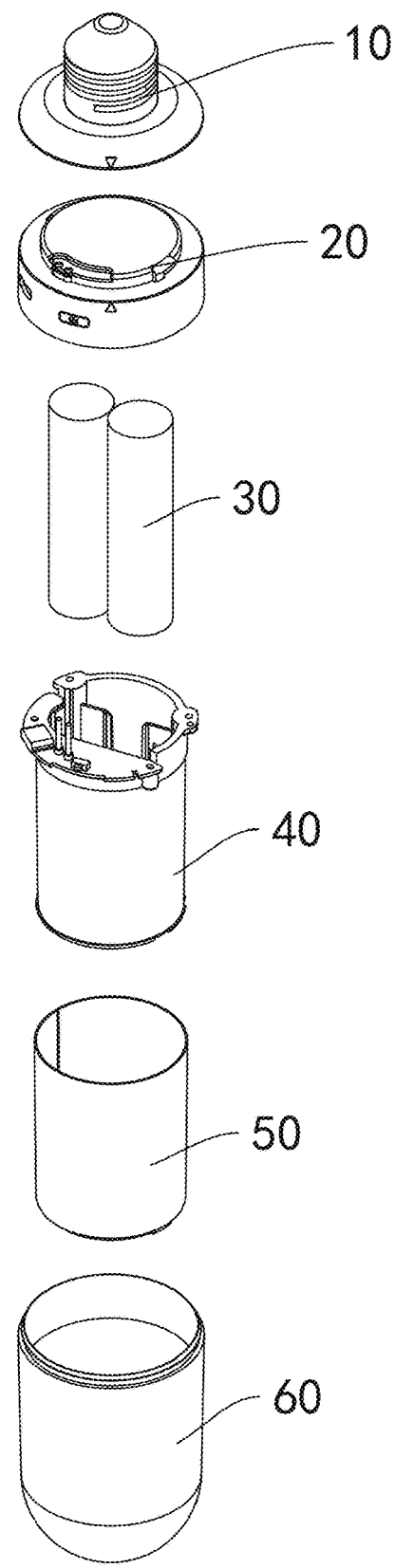
FIG. 11 is an exploded schematic diagram of the LED lamp shown in FIG. 10.
Figure 12:
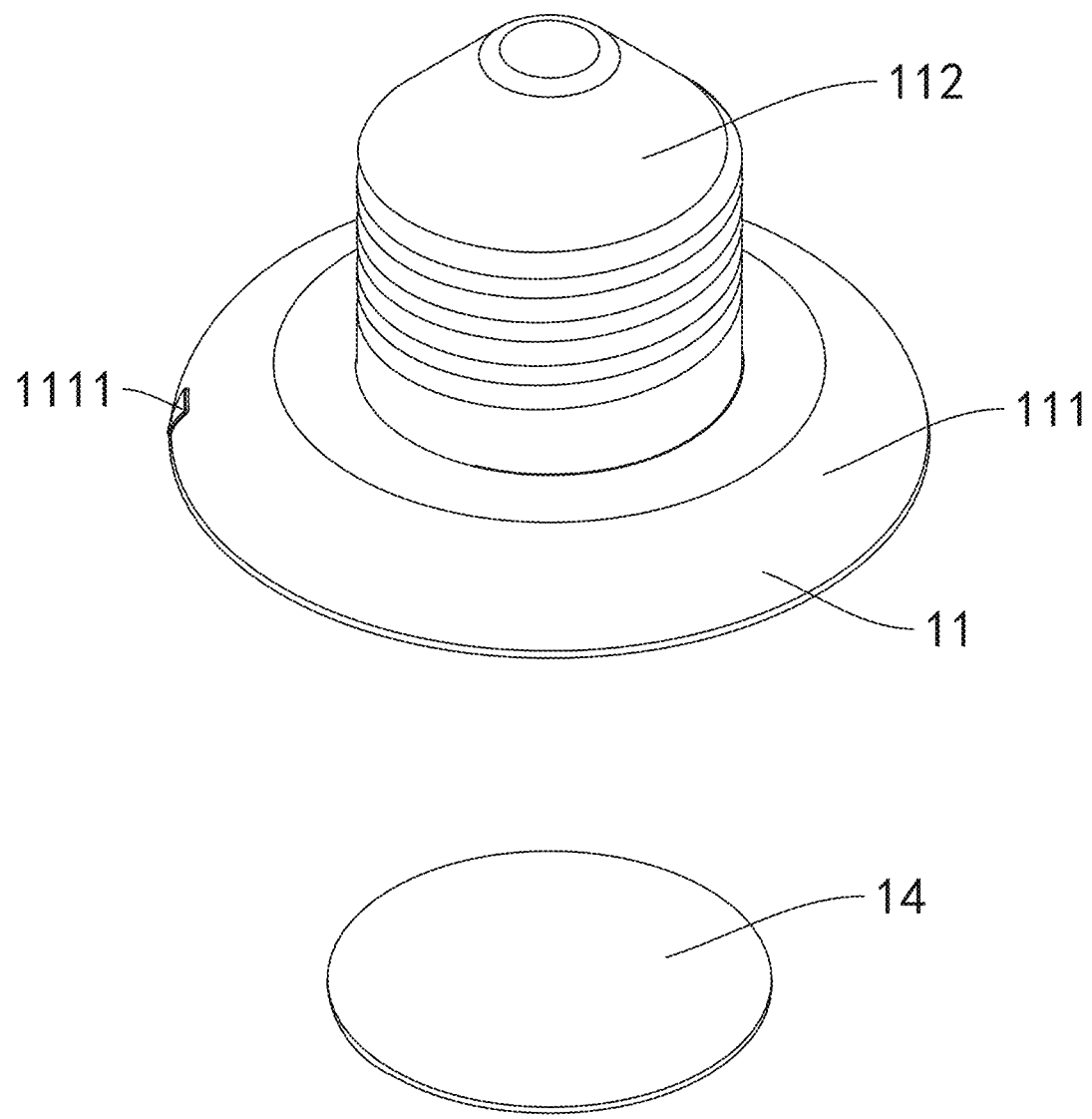
FIG. 12 is an exploded schematic diagram of the connector shown in FIG. 10.
Figure 13:
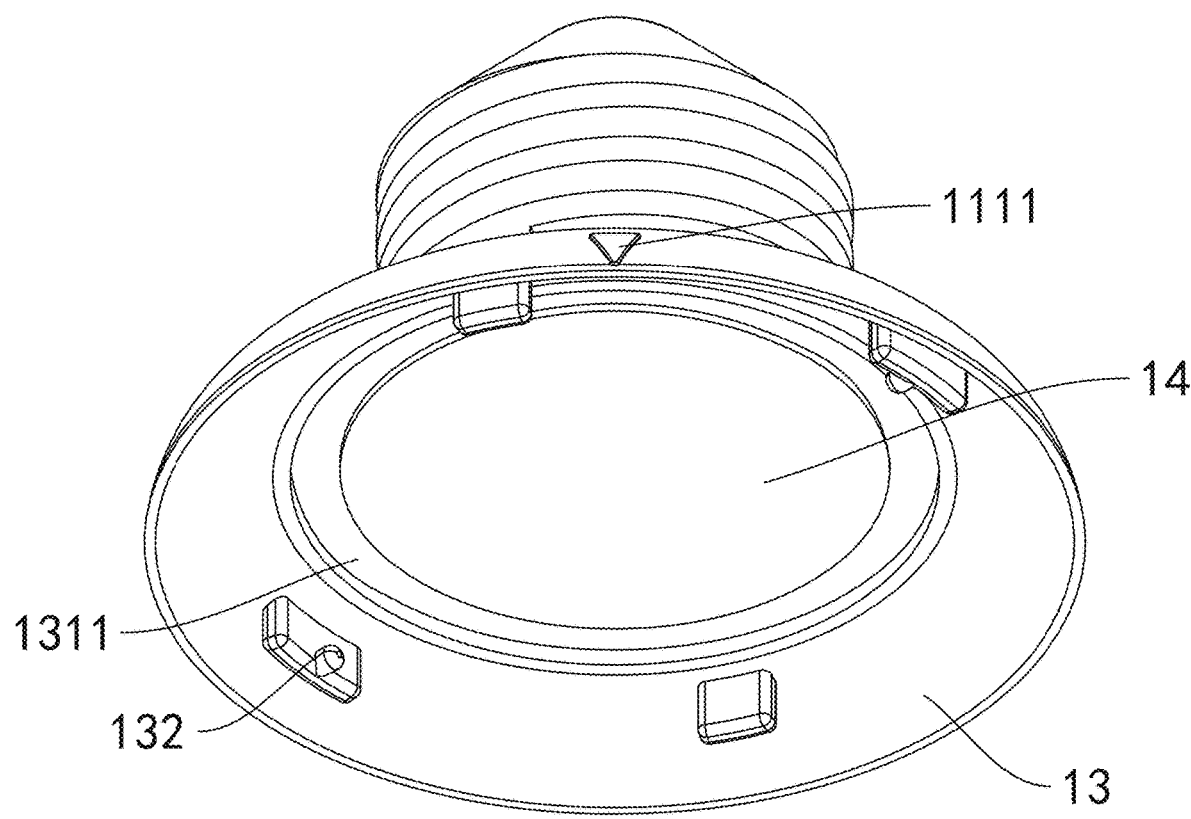
FIG. 13 is a schematic axial view of the connector shown in FIG. 10.
Figure 14:
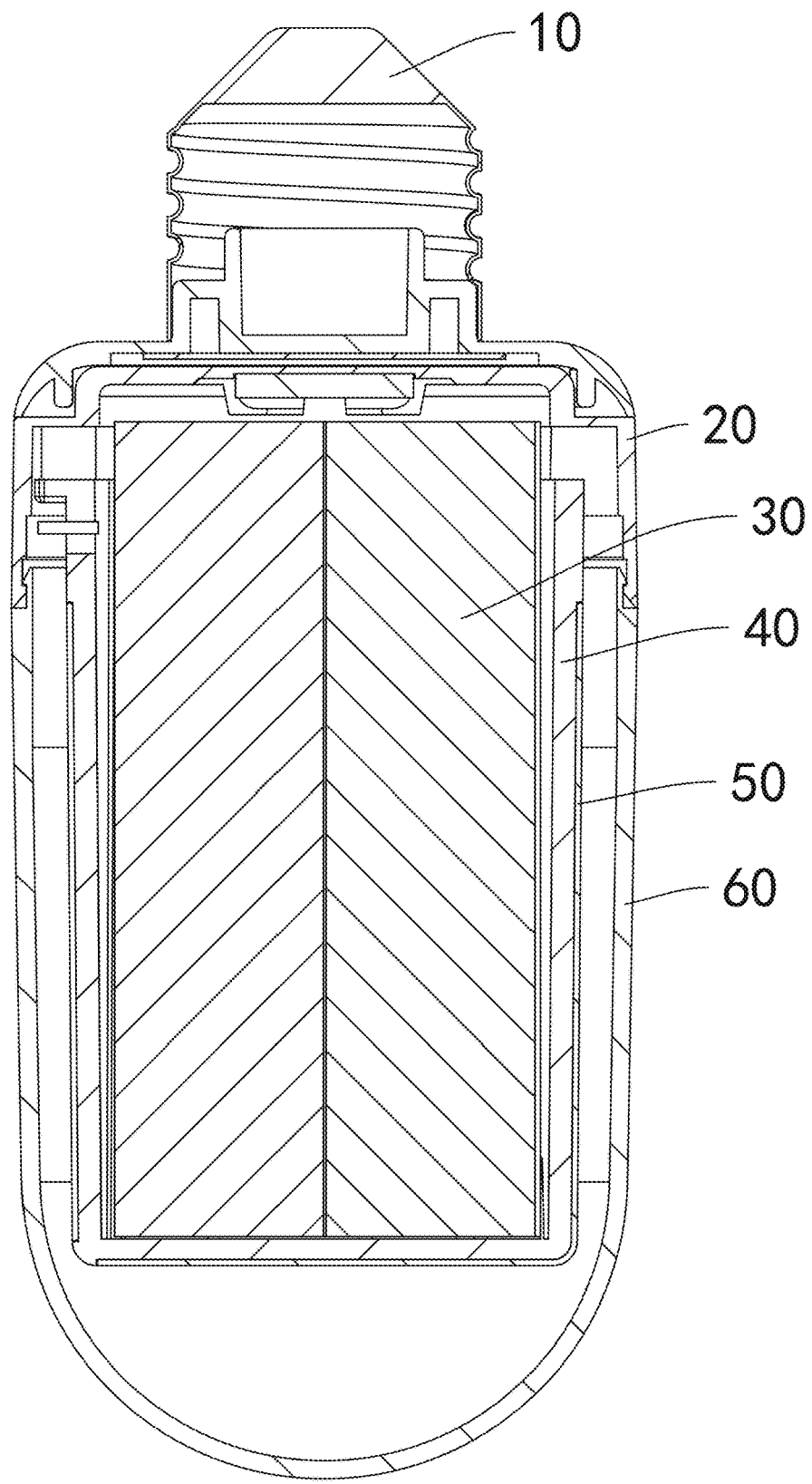
FIG. 14 is a schematic sectional view of the LED lamp shown in FIG. 10.

Numeral reference: 10—connector; 11—connection part; 111—connection housing; 1111—second connection prompt; 112—plug; 12—connection control part; 121—connection circuit board; 122—second connection terminal; 13—connection bottom shell; 131—bottom shell body; 1311—second magnetic suction installation hole; 1312—second terminal hole; 132—connection clamp block; 14—second magnetic attraction member; 20—lamp holder; 21—lamp holder housing; 211—connection clamp slot; 212—first terminal hole; 213—keyhole; 214—charging port; 215—lamp hole; 216—first connection prompt; 217—lamp holder magnetic attractive fixing groove; 22—first magnetic attraction member; 23—limit block; 30—battery; 40—support member; 41—support control part; 411—support circuit board; 412—button; 413—first connection terminal; 414—charging port; 42—support part; 421—support shell; 4211—battery installation slot; 422—fixing plate; 4221—fixing body; 4222—guide bar; 50—light source; 60—lampshade.

DESCRIPTION OF EMBODIMENTS

Please refer to the diagram, where the same component symbols represent the same components. The principle of this application is illustrated by implementing it in an appropriate computing environment. The following description is based on the specific embodiments illustrated in this application and should not be construed as limiting other specific embodiments not described in this application.

Please refer to FIGS. 1-9, an LED light may include a connector 10, a lamp holder 20, a battery 30, a support member 40, a light source 50, and a lampshade 60. The light source 50 is capable of emitting light and is sleeved on the support member 40. The battery 30 is located inside the support member 40. The support member 40 is connected to the lamp holder 20. The lampshade 60 is connected to the lamp holder 20. The connector 10 can be disassembled connected to the lamp holder 20.

The support member 40 may include a support control part 41 and a support part 42. The support control part 41 is connected to the support part 42. The support control part 41 may include a support circuit board 411, a button 412, a first connection terminal 413, a charging port 414, and an indicator light. The button 412, the first connection terminal 413, the charging port 414, the indicator light are connected to the support circuit board 411. The light source 50 is connected to the support circuit board 411, and the battery 30 is connected to the support circuit board 411. The battery 30 supplies power to the LED lights. The support circuit board 411 controls a working state of the light source 50. The charging port 414 is connected to an external power source to supply power to the battery 30. A user can control the support circuit board 411 through a button 412, thereby controlling a control state of the light source 50.

The support part 42 may include a support shell 421 and a fixing plate 422. There are a plurality of fixing plates 422. The fixing plates 422 facilitate a fixation of the battery 30. The support shell 421 can be provided with an installation slot of the battery 30. The fixing plate 422 is fixedly provided in the installation slot of the battery 30. The battery 30 is located between the fixing plates 422 in the installation slot of the battery 30. The fixing plate 422 may include a fixing body 4221 and a guide bar 4222. The guide bar 4222 is connected to the fixing body 4221. The guide bar 4222 can also be connected to a side wall of the installation slot of the battery 30. The guide bar 4222 can guide an installation position of the battery 30 and assist in fixing the battery 30.

The lamp holder 20 may include a lamp holder housing 21, a first magnetic attraction member 22, and a limit block 23. The first magnetic attraction member 22 and the limit block 23 are connected to the lamp holder housing 21. The lamp holder housing 21 can be provided with a connection clamp slot 211, a first terminal hole 212, a keyhole 213, a charging port 214, a lamp hole 215, a first connection prompt 216, and a lamp holder magnetic attractive fixing groove 217. The first connection terminal 413 passes through the first terminal hole 212. The button 412 passes through the keyhole 213. The lamp hole 215 corresponds to the indicator light and exposes at least a part of the indicator light. The charging port 414 passes through the charging port 214. The lamp holder magnetic attractive fixing groove 217 is located inside the lamp holder housing 21, which facilitates the fixing of the first magnetic attraction member 22. The limit block 23 is located inside the lamp holder housing 21, facilitating to guide a connection position of the support member 40 that is connected to the lamp holder 20. The button 412 is located on one side of the lamp holder housing 21, and the charging port 414 is located on one side of the lamp holder housing 21.

The connector 10 may include a connection part 11, a connection control part 12, a connection bottom shell 13, and a second magnetic attraction member 14. The connection part 11 includes a connection housing 111 and a plug 112. The plug 112 is fixedly connected to the connection housing 111. The connection control part 12 may include a connection circuit board 121 and a second connection terminal 122. The second connection terminal 122 is connected to the connection circuit board 121. The plug 112 is connected to the connection circuit board 121. The connection bottom shell 13 may include a bottom shell body 131 and a connection clamp block 132. The connection clamp block 132 is connected to a main body of the connection bottom shell 13. The bottom shell body 131 may be provided with a second magnetic suction installation hole 1311 and a second terminal hole 1312. The second magnetic attraction member 14 is located in the second magnetic suction installation hole 1311, and the second connection terminal 122 passes through the second terminal hole 1312.

A detachable connection way between the connector 10 and the lamp holder 20 is magnetic suction connection and snap connection. Through a magnetic attraction cooperation between the first magnetic attraction member 22 and the second magnetic attraction member 14, as well as a cooperation between the connection clamp block 132 and the connection clamp slot 211. By the magnetic attraction combination of the first magnetic attraction member 22 and the second magnetic attraction member 14, it is possible to quickly and conveniently connect and disassemble. A cooperation between the connection clamp block 132 and the connection clamp slot 211 can further enhance a connection strength without affecting the quick installation and disassembly of the connector 10 and the lamp holder 20.

The connection housing 111 is provided with a second connection prompt 1111, and the first connection prompt 216 cooperates with the second connection prompt 1111 to prompt the user to connect the connector 10 with the lamp holder 20. After the connection between the connector 10 and the lamp holder 20 is completed, the first connection terminal 413 is connected to the second connection terminal 122.

The plug 112 is inserted into a corresponding socket, and then the plug 112 receives the power provided by the socket. The power received by the plug 112 is supplied to the light source 50 through the connection circuit board 121, the second connection terminal 122, the first connection terminal 413, and the support circuit board 411. The battery 30 can store excess electricity.

It can be understood that there are 2 batteries 30. The first magnetic attraction member 22 and the second magnetic attraction member 14 may be magnetic substances. The light source 50 can be a soft light board. There are two second connection terminals 122, and the two second connection terminals 122 are arranged close to each other. The second connection terminals 122 are located at an edge of the connection circuit board 121. The second connection terminals 122 can be an electrode pin.

It can be understood that the present application facilitates the use of the LED light through a detachable design of the connector 10 and the lamp holder 20. Which also enables the LED light to be flexibly selected and used according to usage needs.

In an implementation mode, there are the first magnetic attraction member 22 and the second magnetic attraction member 14. This application may not include the first magnetic attraction member 22 or the second magnetic attraction member 14, and a detachable design of the connector 10 and the lamp holder 20 can be achieved by the connection clamp block 132 and the connection clamp slot 211.

Please further refer to FIGS. 10-14. In an implementation mode, there is the connection control part, the design of connecting the connector 10 to the connection control part 12 can be eliminated. The plug 112 is inserted into the corresponding socket, but the plug 112 cannot accept the power provided by the socket and supplies power to the light source 50 through the battery 30. A connection between the connection bottom shell 13 and the connection part 11 can be designed as a whole.

Figure 15:
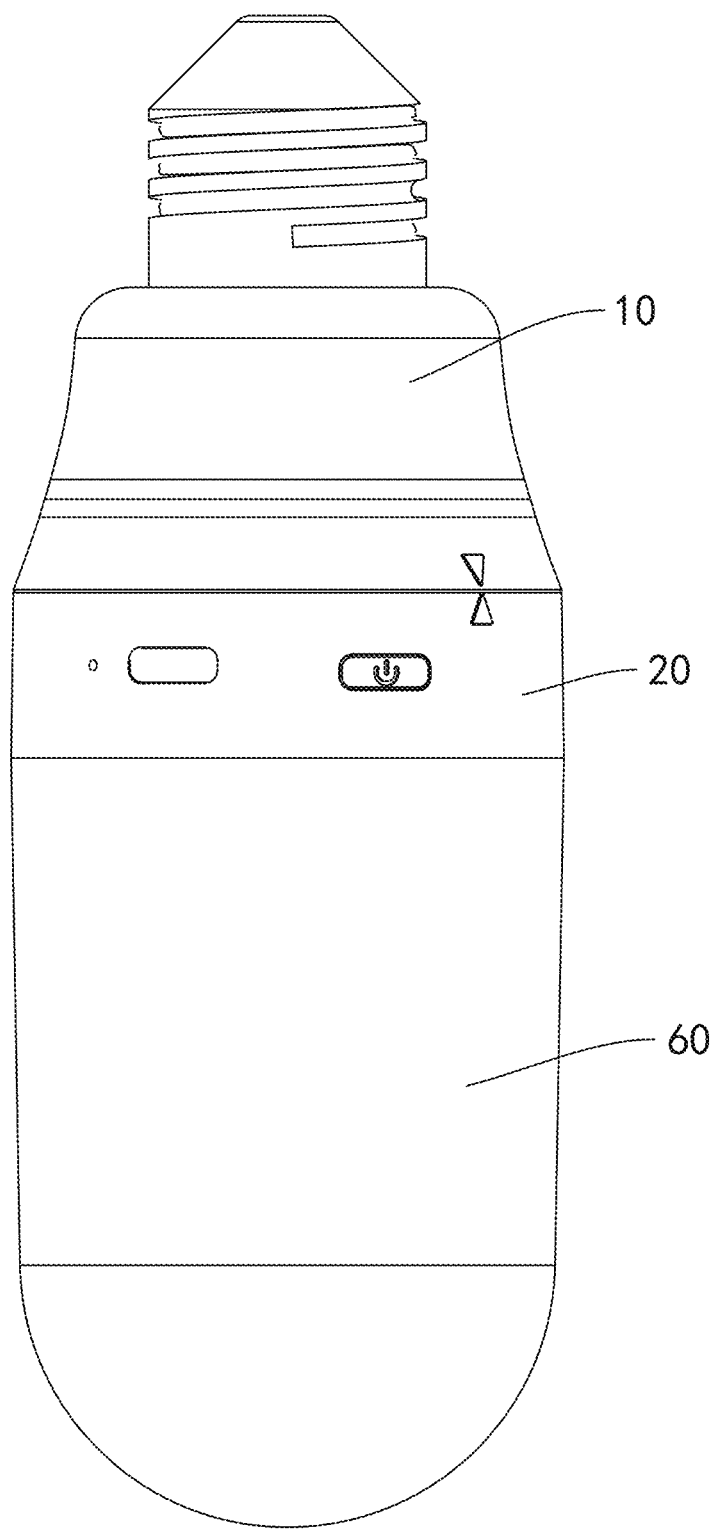
FIG. 15 is another schematic structural diagram of the LED lamp in an embodiment of the present application.
Figure 16:
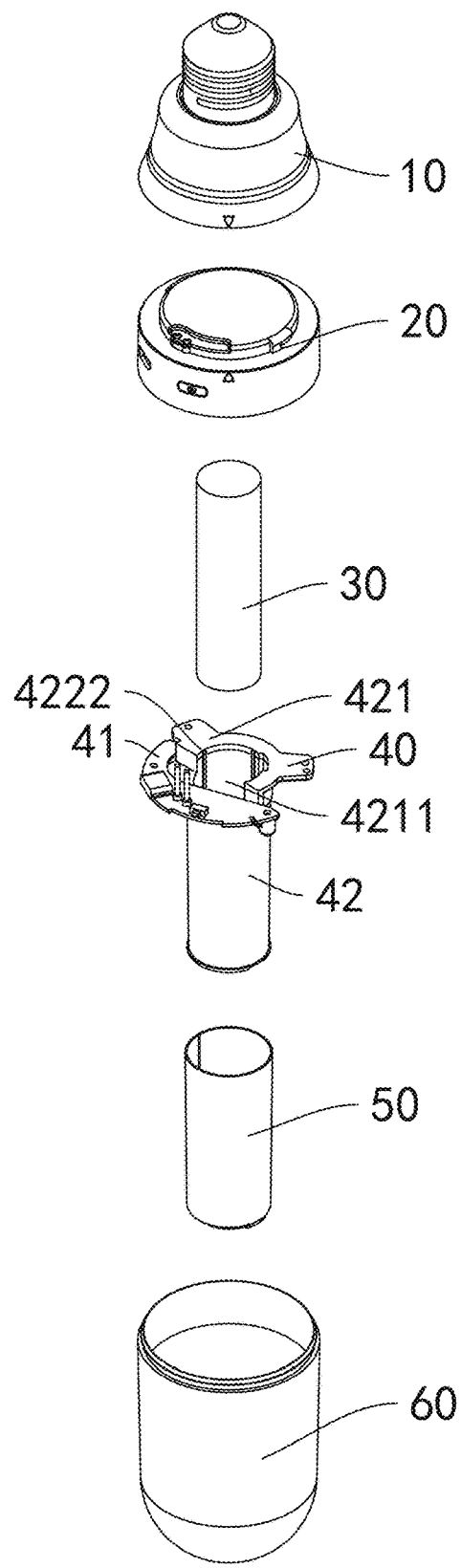
FIG. 16 is an exploded schematic diagram of the LED lamp shown in FIG. 15.
Figure 17:
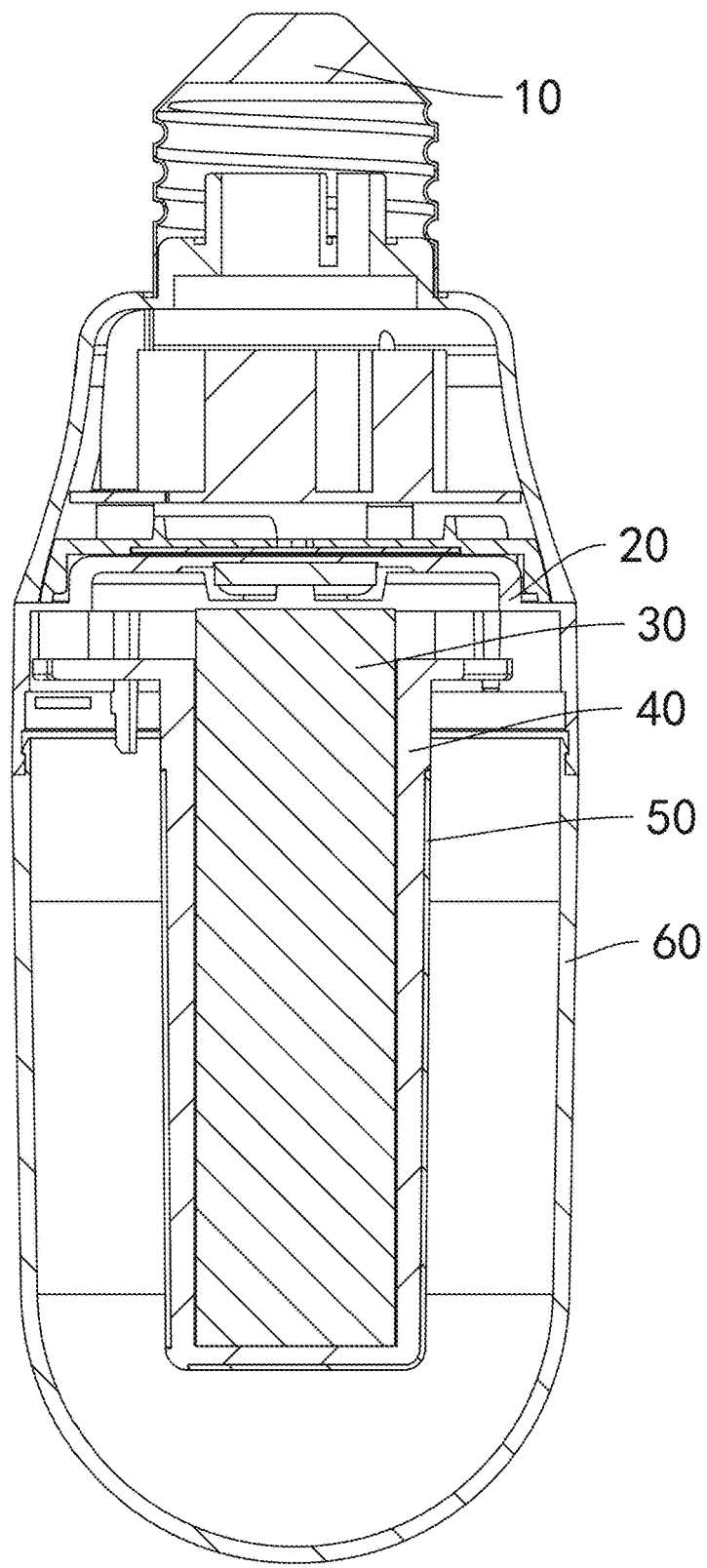
FIG. 17 is a schematic sectional view of the LED lamp shown in FIG. 15.

Please further refer to FIGS. 15-17. In an implementation mode, there is the fixing plate 422, the support part 42 can eliminate the design of the fixing plate 422, the battery 30 is fixed through the installation slot of the battery 30. The guide bar 4222 on the installation slot of the battery 30 guides an installation position of the battery 30 and assists in fixing the battery 30. There is one battery 30.

Figure 18:
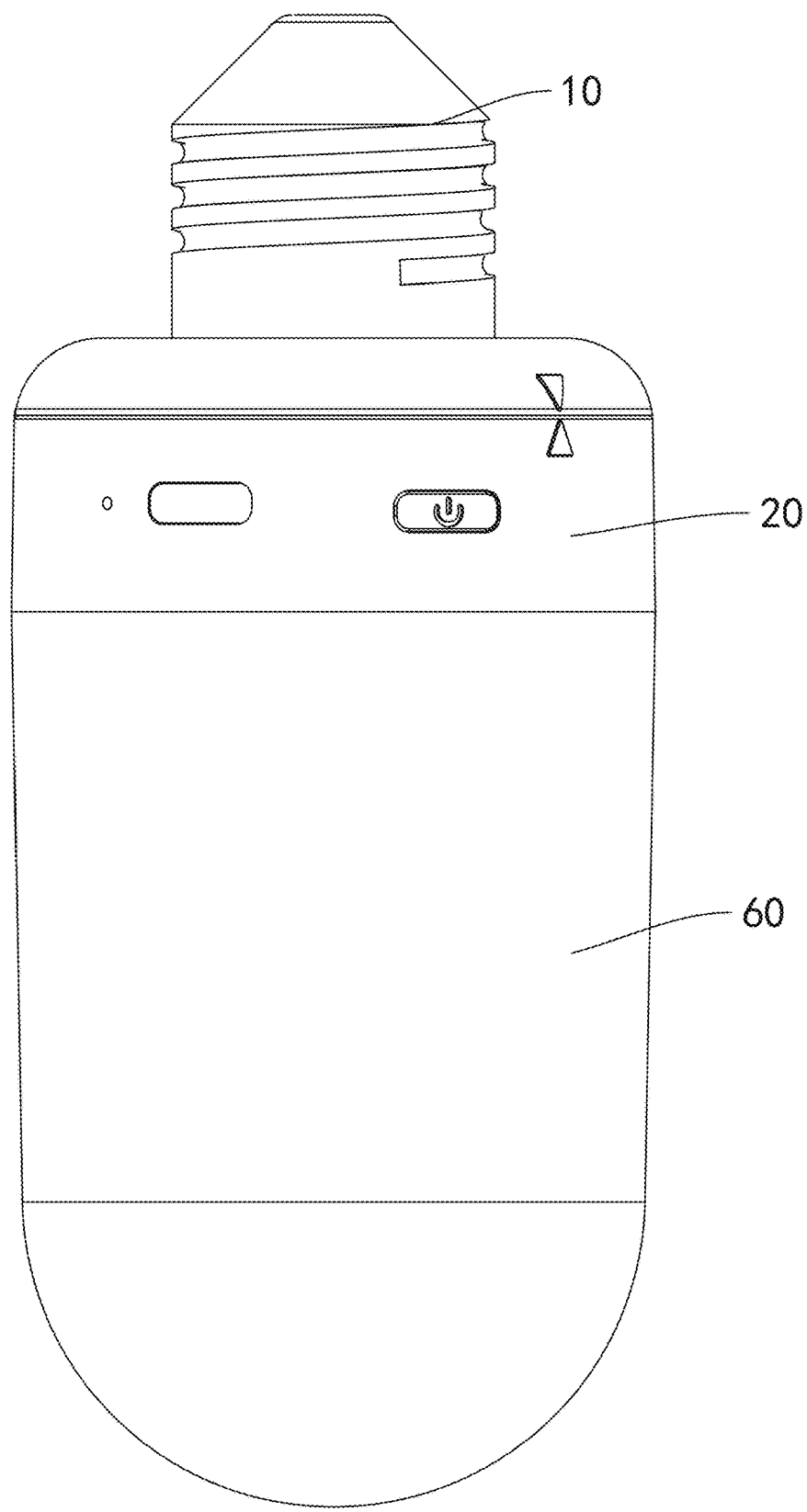
FIG. 18 is another schematic structural diagram of the LED lamp in an embodiment of the present application.
Figure 19:
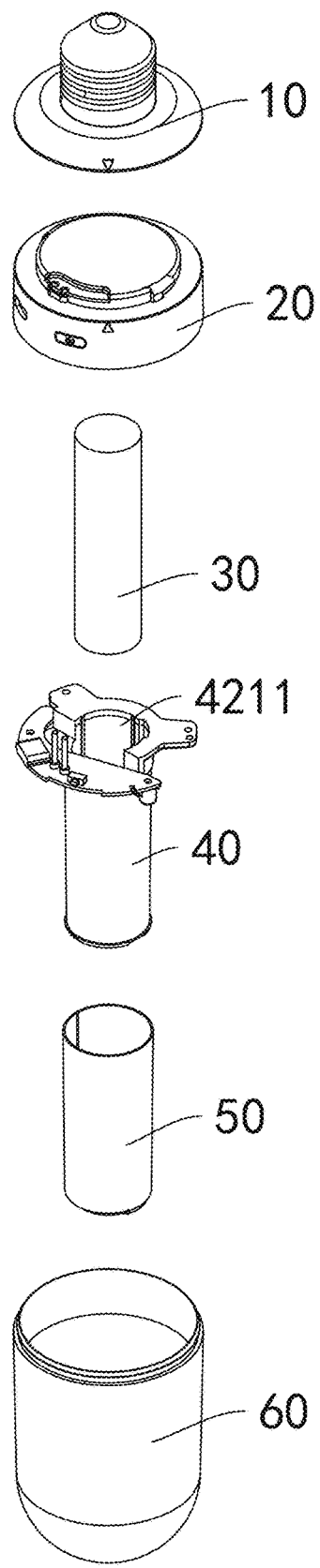
FIG. 19 is an exploded schematic diagram of the LED lamp shown in FIG. 18.
Figure 20:
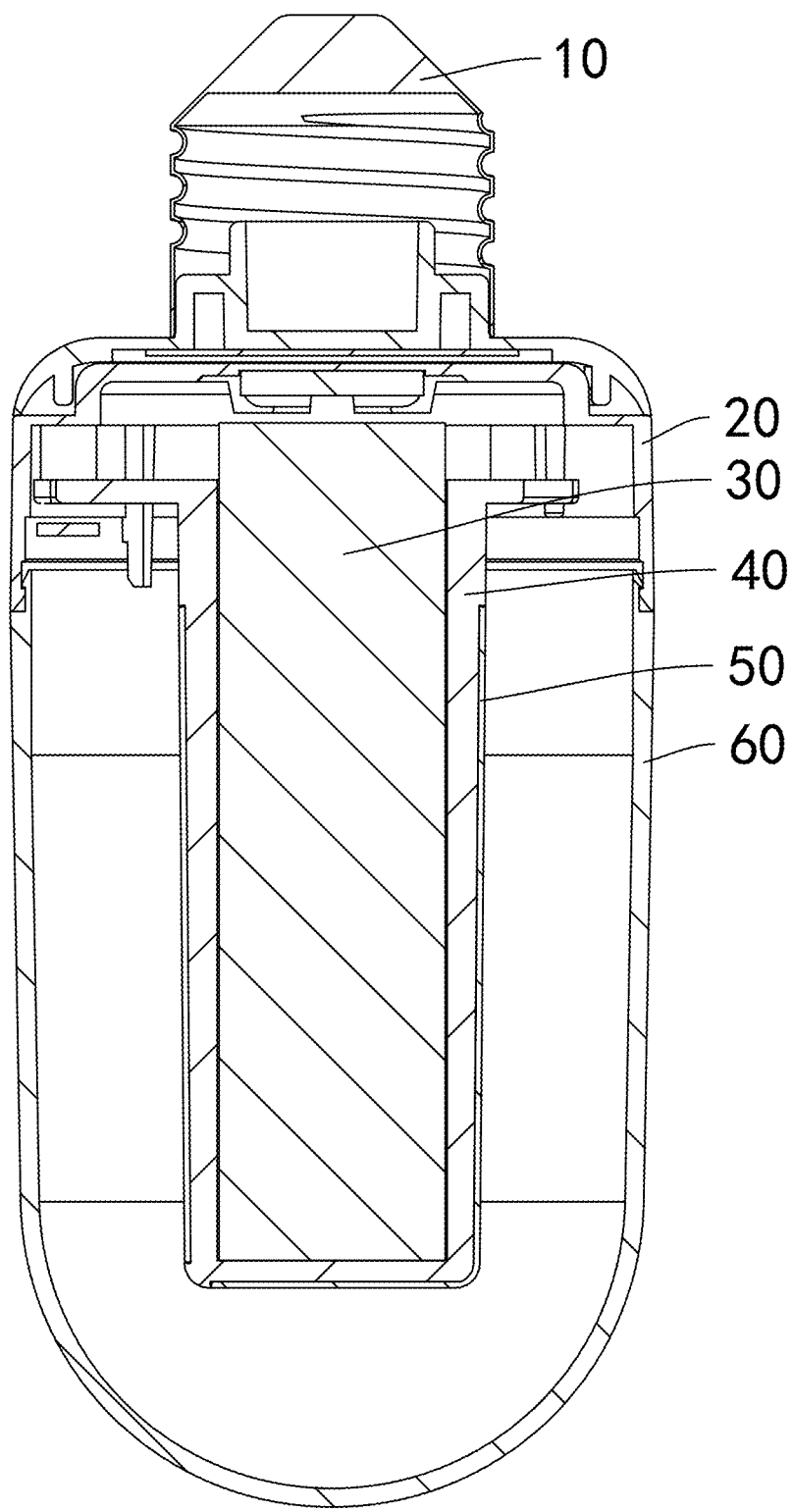
FIG. 20 is a schematic sectional view of the LED lamp shown in FIG. 18.

Please further refer to FIGS. 18-20. It can be understood that the design of connecting the connector 10 to the connection control part 12 can be eliminated, and the design of the support part 42 to the fixing plate 422 can be eliminated.

Figure 21:
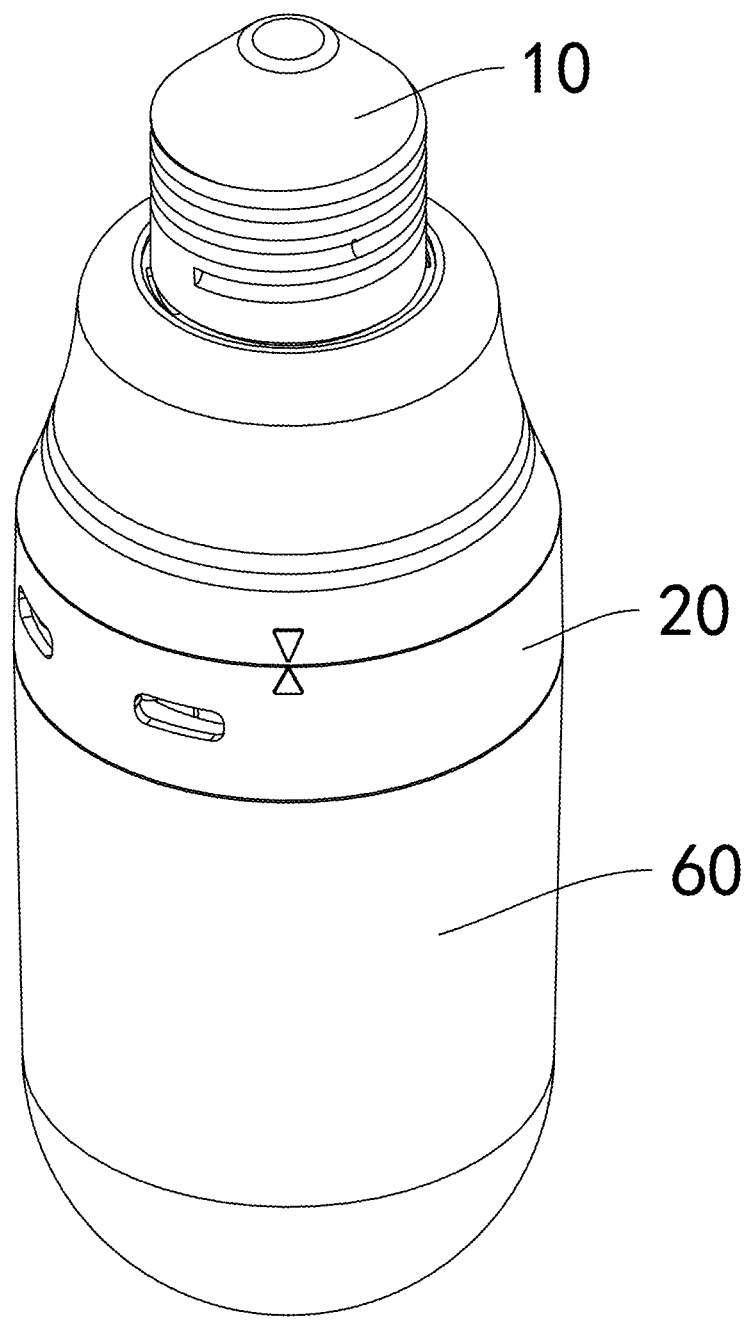
FIG. 21 is another schematic structural diagram of the LED lamp in an embodiment of the present application.
Figure 22:
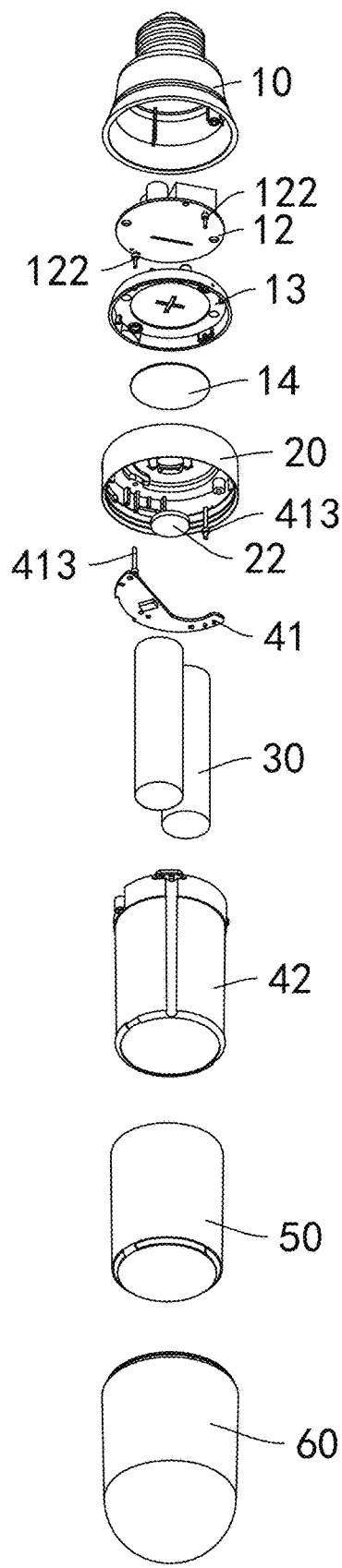
FIG. 22 is an exploded schematic diagram of the LED lamp shown in FIG. 21.

Please further refer to FIGS. 21-22, it can be understood that the second connection terminal 122 is located at an edge of the connection circuit board 121, and the second connection terminals 122 are arranged to be apart.

Figure 23:
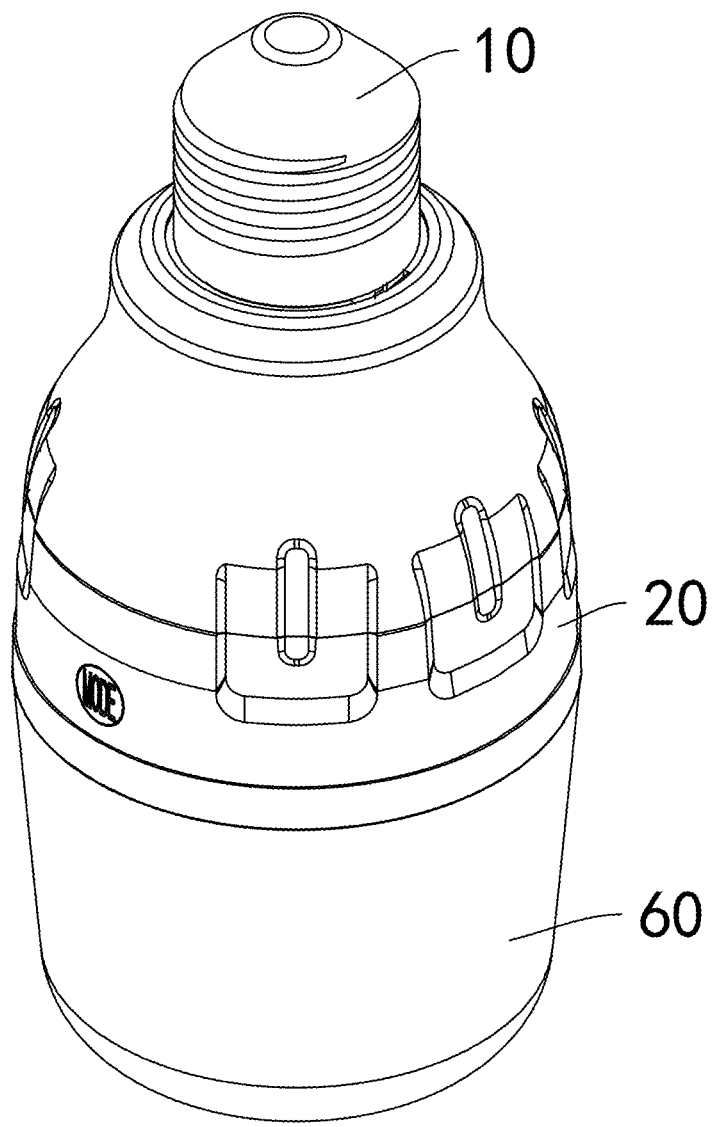
FIG. 23 is another schematic structural diagram of the LED lamp in an embodiment of the present application.
Figure 24:
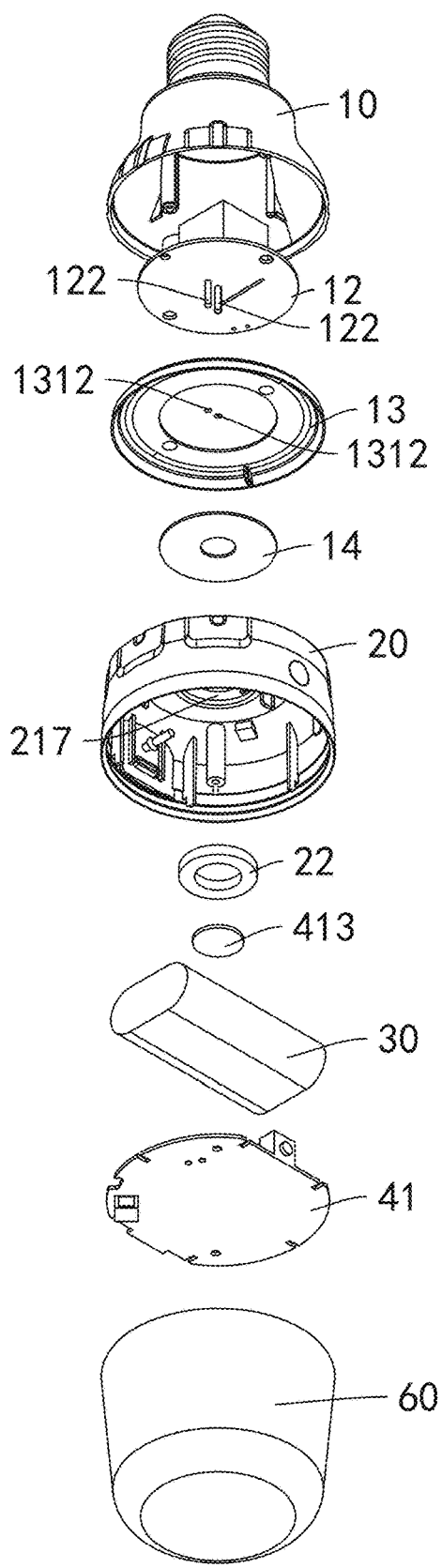
FIG. 24 is an exploded schematic diagram of the LED lamp shown in FIG. 23.

Please further refer to FIGS. 23-24, it can be understood that the second connection terminals 122 are arranged close to each other, and the second connection terminals 122 are located in a middle of the connection circuit board 121. For the convenience of connection, the first magnetic attraction member 22 and the second magnetic attraction member 14 are provided with holes to facilitate the insertion of the second connection terminal 122 and the connection with the first connection terminal 413. In an implementation mode, the second connection terminal 122 passes through the second terminal hole 1312, the second magnetic attraction member 14, the lamp holder housing 21, and the first magnetic attraction member 22 are connected to the first connection terminal 413.

Figure 25:
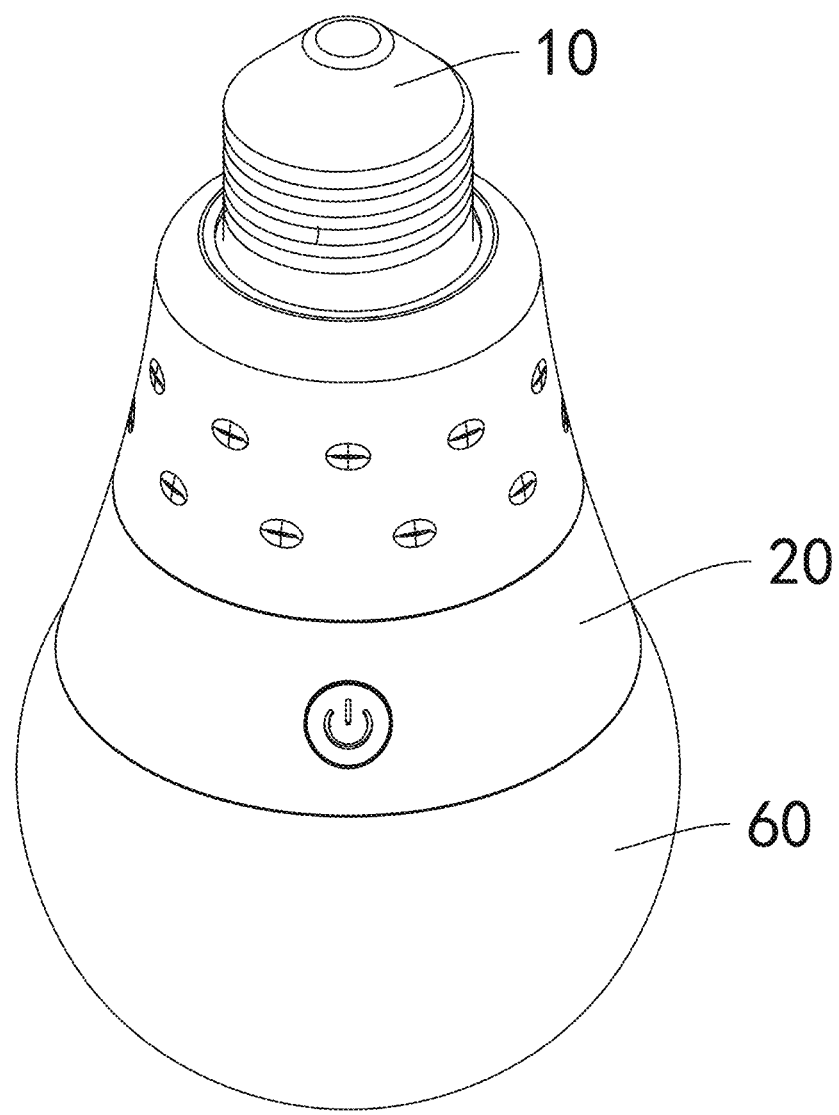
FIG. 25 is another schematic structural diagram of the LED lamp in an embodiment of the present application.
Figure 26:
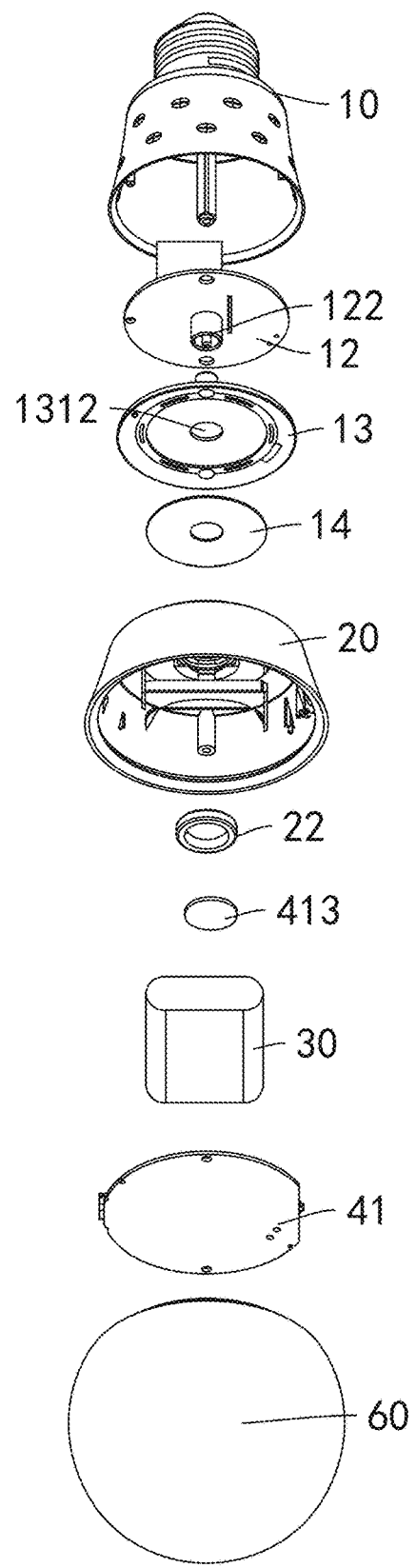
FIG. 26 is an exploded schematic diagram of the LED lamp shown in FIG. 25.

Please further refer to FIGS. 25-26. It can be understood that there are one second connection terminal 122, located in a middle of the connection circuit board 121. The second connection terminal 122 can be a Direct Current Jack, (DC) interface. For the convenience of connection, the first magnetic attraction member 22 and the second magnetic attraction member 14 are provided with holes to facilitate the insertion of the second connection terminal 122 and the connection with the first connection terminal 413. In an implementation mode, the second connection terminal 122 passes through the second terminal hole 1312, the second magnetic attraction member 14, the lamp holder housing 21, and the first magnetic attraction member 22 are connected to the first connection terminal 413.

Figure 27:
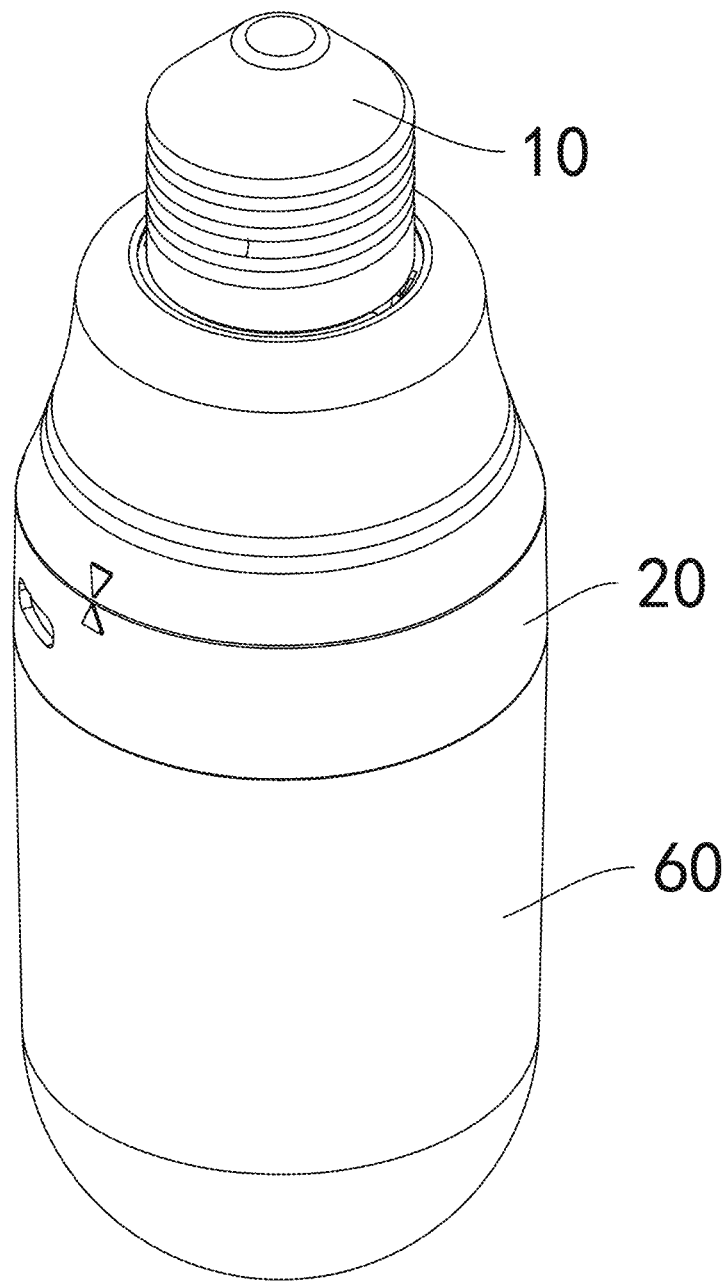
FIG. 27 is another schematic structural diagram of the LED lamp in an embodiment of the present application.
Figure 28:
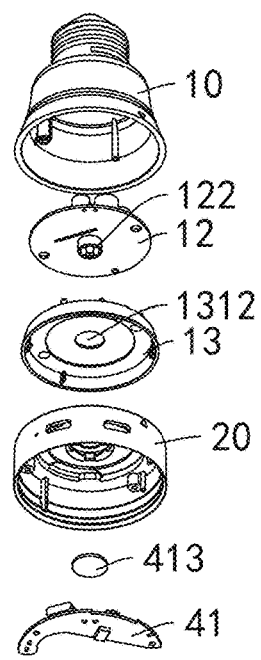
FIG. 28 is an exploded schematic diagram of the LED lamp shown in FIG. 27.
Figure 28:
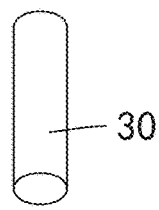
Figure 28:
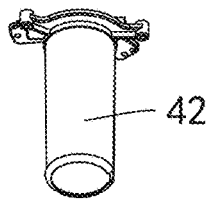
Figure 28:
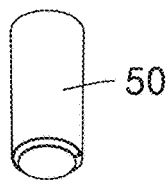
Figure 28:
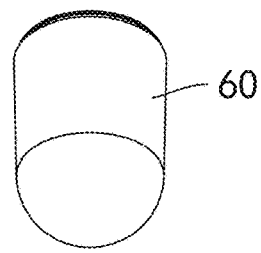

Please further refer to FIGS. 27-28. It can be understood that the design of the first magnetic attraction member 22 and the second magnetic attraction member 14 can be eliminated, rendering it more convenient to connect the second connection terminal 122 to the first connection terminal 413.

Figure 29:
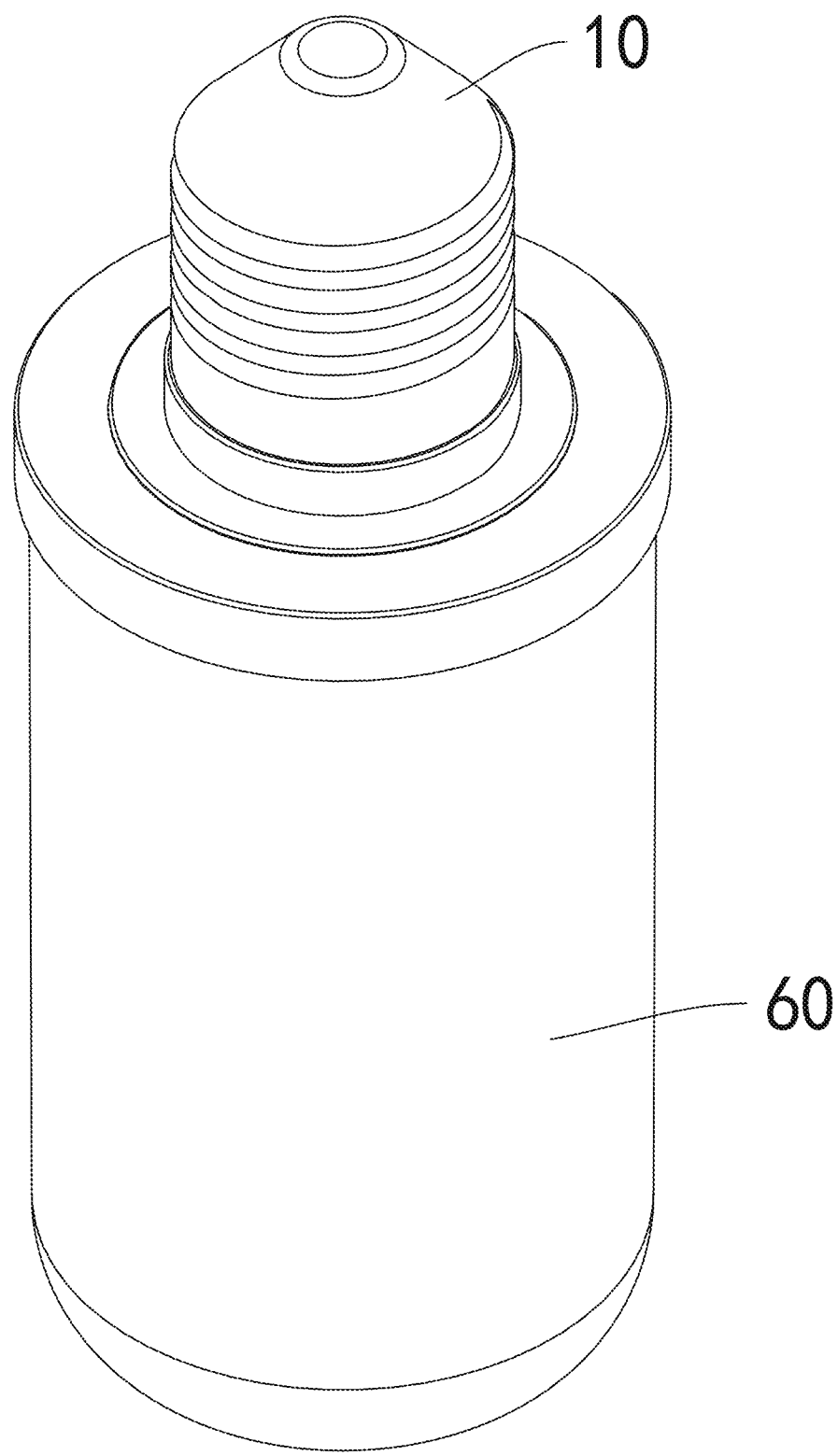
FIG. 29 is another schematic structural diagram of the LED lamp in an embodiment of the present application.
Figure 30:
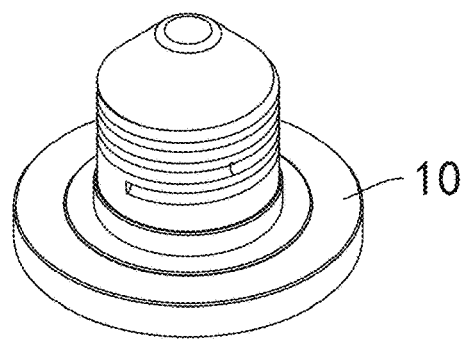
FIG. 30 is an exploded schematic diagram of the LED lamp shown in FIG. 29.
Figure 30:
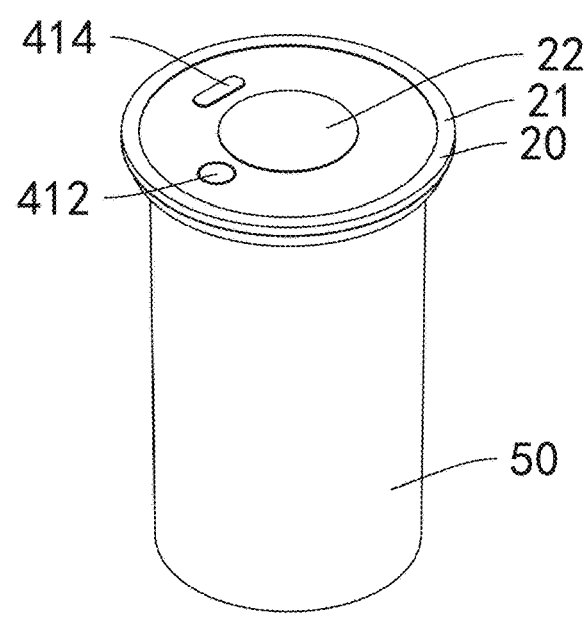
Figure 30:
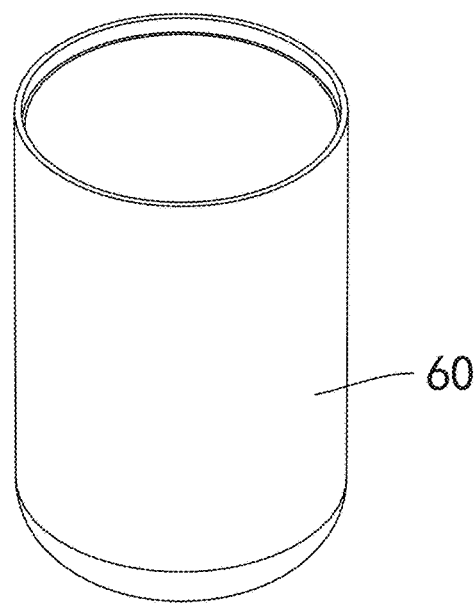

Please further refer to FIGS. 29-30. It can be understood that the button 412 can be located at a top of the lamp holder housing 21, the charging port 414 can be located at a top of the lamp holder housing 21, and the first magnetic attraction member 22 can be located at a top of the lamp holder housing 21.

This specification uses specific examples to explain the principles and implementation modes of the present application. The above examples are only used to help understand the methods and core ideas of the present application; and, for those skilled in the art, there may be changes in the specific implementation modes and application scope based on the ideas of this application. In summary, the content of this specification should not be understood as limiting this application.

What is claimed is:

1. An LED lamp, comprising a connector, a lamp holder, a battery, a support member, a light source, and a lampshade; the light source is sleeved on the support member; the battery is located inside the support member; the support member is connected to the lamp holder; the lampshade is connected to the lamp holder; the connector is detachably connected to the lamp holder; the connector comprises a connection bottom shell;
   wherein the connector is magnetically connected to the lamp holder, and the lamp holder comprises a lamp holder housing and a first magnetic attraction member;
   the first magnetic attraction member is connected to the lamp holder housing.

2. The LED lamp according to claim 1, wherein the support member comprises a support control part and a support part;
   the support control part is connected to the support part;
   the support control part comprises a support circuit board and a first connection terminal;
   the first connection terminal is connected to the support circuit board;
   the light source is connected to the support circuit board, and the battery is connected to the support circuit board.

3. The LED lamp according to claim 1, wherein the connector further comprises a connection part and a second magnetic attraction member;
- the connection bottom shell is connected to the connection part;
- the second magnetic attraction member is connected to the connection bottom shell.

4. The LED lamp according to claim 3, wherein the connection part comprises a connection housing and a plug, wherein the plug is connected to the connection housing.

5. The LED lamp according to claim 1, wherein the connector is fastened to the lamp holder, and the connection bottom shell comprises a bottom shell body and a connection clamp block,
- wherein the connection clamp block is connected to the bottom shell body;
- the lamp holder housing is provided with a connection clamp slot; the connection clamp block is inserted into the connection clamp slot.

6. The LED lamp according to claim 1, wherein the connector comprises a connection control part; the connection control part comprises a connection circuit board and a second connection terminal; the connection circuit board is connected to the second connection terminal.

7. The LED lamp according to claim 6, wherein the second connection terminal is one or more of an electrode pin, a DC interface, and a USB interface.

* * * * *